(12) United States Patent
Newton et al.

(10) Patent No.: US 9,769,906 B2
(45) Date of Patent: Sep. 19, 2017

(54) METHOD AND APPARATUS FOR CONTROLLING LIGHTING UNITS BASED ON MEASURED FORCE AND/OR MOVEMENT OF ASSOCIATED LUMINAIRES

(71) Applicant: PHILIPS LIGHTING HOLDING B.V., Eindhoven (NL)

(72) Inventors: Philip Steven Newton, Waalre (NL); Bartel Marinus Van De Sluis, Eindhoven (NL); Ramon Antoine Wiro Clout, Eindhoven (NL); Tatiana Aleksandrovna Lashina, Eindhoven (NL); Dzmitry Viktorovich Aliakseyeu, Eindhoven (NL); Tim Dekker, Eindhoven (NL); Dirk Valentinus René Engelen, Heusden-Zolder (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/122,248

(22) PCT Filed: Feb. 16, 2015

(86) PCT No.: PCT/IB2015/051134
§ 371 (c)(1),
(2) Date: Aug. 29, 2016

(87) PCT Pub. No.: WO2015/128771
PCT Pub. Date: Sep. 3, 2015

(65) Prior Publication Data
US 2016/0374179 A1   Dec. 22, 2016

Related U.S. Application Data

(60) Provisional application No. 61/946,178, filed on Feb. 28, 2014.

(51) Int. Cl.
H05B 37/02 (2006.01)
H05B 33/08 (2006.01)
F21K 9/238 (2016.01)

(52) U.S. Cl.
CPC ..... H05B 37/0227 (2013.01); H05B 33/0845 (2013.01); H05B 33/0884 (2013.01);
(Continued)

(58) Field of Classification Search
CPC   H05B 33/08; H05B 33/0815; H05B 33/0845; H05B 33/0884; H05B 37/02;
(Continued)

(56) References Cited

U.S. PATENT DOCUMENTS 7,597,455 B2 * 10/2009 Smith ............... H05B 33/0842
                                                362/249.01
2013/0106312 A1   5/2013   Beardsley et al.
2014/0043810 A1   2/2014   Jo et al.

FOREIGN PATENT DOCUMENTS

WO   2010083047 A1   7/2010

* cited by examiner

Primary Examiner — Jimmy Vu
(74) Attorney, Agent, or Firm — Meenakshy Chakravorty

(57) ABSTRACT

An LED-based lighting unit (100, 200, 300, 400, 1000, 1100, 1200, 1300, 1400, 1500) may be installable into a luminaire (108, 208, 308, 408, 1008, 1108, 1208, 1308, 1408, 1508) to cause the luminaire to be responsive to applied forces and/or movements to control one or more properties of light emitted by the lighting unit. The lighting unit may include one or more LEDs (102), an accelerometer (114), and a controller (112). The controller may: receive, from the accelerometer, a signal representative of a measured mechanical force applied to or movement of the luminaire in which the LED-based lighting unit is installed; determine, based on the signal from the accelerometer, that the measured mechanical force or movement corresponds to (Continued)

one or more predetermined forces or movements; and energize the one or more LEDs to emit light having one or more properties selected based on the determination.

20 Claims, 9 Drawing Sheets

(52) U.S. Cl.
CPC ..... *H05B 37/0272* (2013.01); *H05B 37/0281* (2013.01); *F21K 9/238* (2016.08)

(58) Field of Classification Search
CPC .............. H05B 37/0227; H05B 7/0272; H05B 37/0281; H05B 37/00; F21K 9/238
USPC ........ 315/130–134, 291, 307, 308, 361, 363
See application file for complete search history.

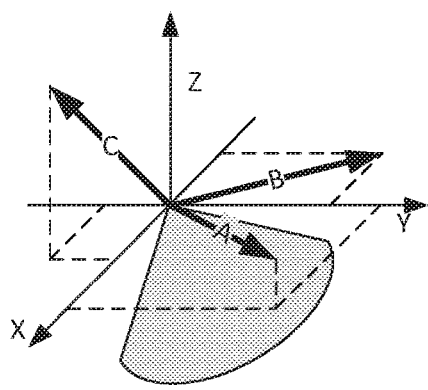
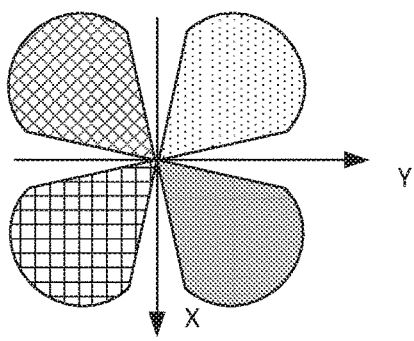
Fig. 6a     Fig. 6b
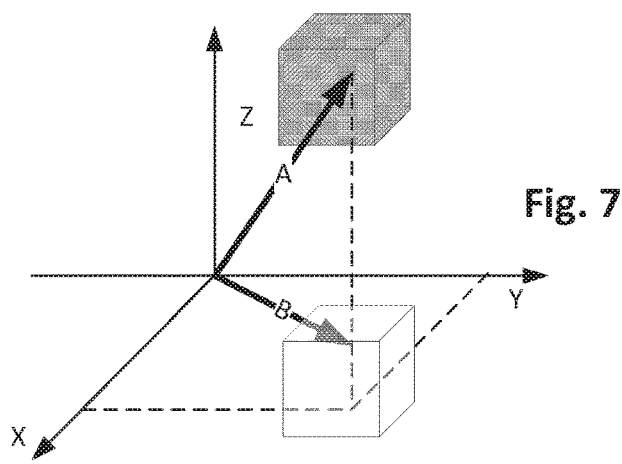
Fig. 7
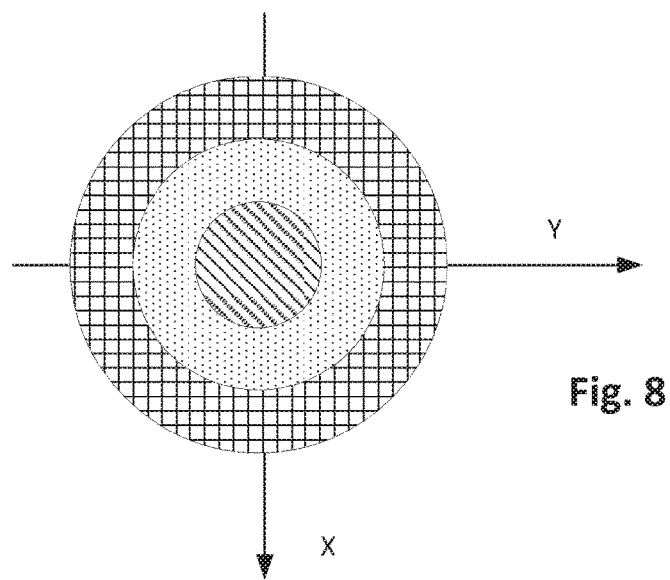
Fig. 8

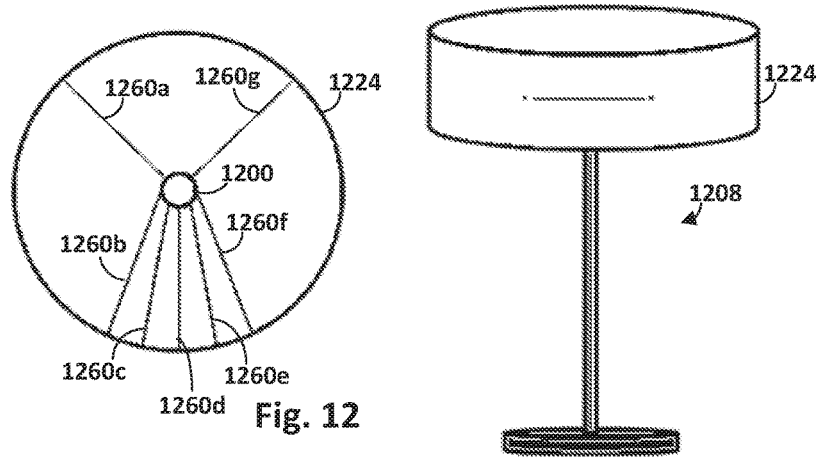
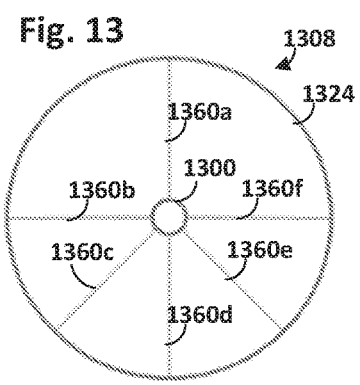
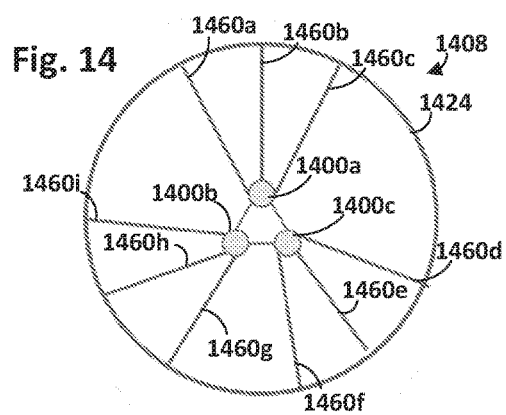
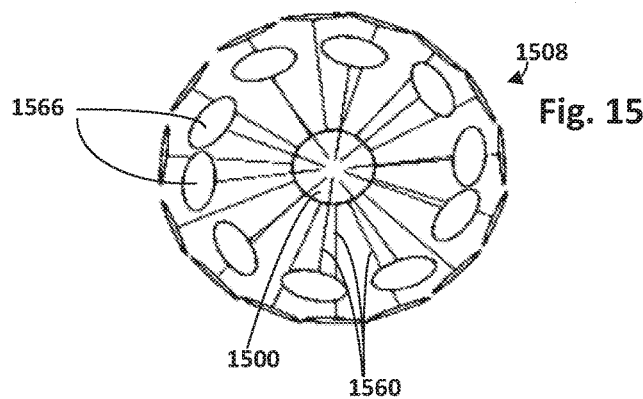

METHOD AND APPARATUS FOR CONTROLLING LIGHTING UNITS BASED ON MEASURED FORCE AND/OR MOVEMENT OF ASSOCIATED LUMINAIRES

CROSS-REFERENCE TO PRIOR APPLICATIONS

This application is the U.S. National Phase application under 35 U.S.C. §371 of International Application No. PCT/IB2015/051134, filed on Feb. 16, 2015, which claims the benefit of U.S. Patent Application No. 61/946,178, filed on Feb. 28, 2014. These applications are hereby incorporated by reference herein.

TECHNICAL FIELD

The present invention is directed generally to lighting control. More particularly, various inventive methods and apparatus disclosed herein relate to controlling one or more properties of light emitted by a lighting unit based on one or more measured forces applied to, or movements of, a luminaire in which the lighting unit is installed.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Lamps and luminaires exist that provide users with limited capabilities to control emitted light with techniques other than operation of switches. For instance, a "clapper" device enables a lamp to be controlled with sound, typically in the form of one or more claps from a user. Other lamps include touch-sensitive surfaces that may be at least partially capacitive. A user's touch may be detected based on a change in that capacitance, and light emitted by one or more light sources of the lamp may be altered based on the nature of the user's touch. However, such a lamp may require a custom luminaire designed to have an alterable capacitance. It may not be possible, or at least practicable, to customize an existing, conventional luminaire to be operable by a user's touch. For instance, an antique luminaire with artistic and/or sentimental value may not be suitable for conversion into a capacitance-based touch-sensitive lamp.

Based on the foregoing, there is a need in the art to enable ordinary and/or conventional luminaires to be converted to touch-controlled luminaires.

SUMMARY

The present disclosure is directed to inventive methods and apparatus for lighting control. For example, a lighting unit that is installable into a conventional luminaire may be configured with one or more components configured to measure mechanical force applied to a luminaire, such as might be caused by user tapping or dragging a finger across a surface of the luminaire, and/or movement of the luminaire. One or more properties of light emitted by such a lighting unit may be selected and controlled based on one or more signals from these one or more components.

Generally, in one aspect, the invention relates to an LED-based lighting unit for installation into a luminaire, which includes: one or more LEDs; an accelerometer; and a controller coupled with the one or more LEDs and the accelerometer. The controller may be configured to: receive, from the accelerometer, a signal representative of a measured mechanical force applied to or movement of the luminaire in which the LED-based lighting unit is installed; determine, based on the signal from the accelerometer, that the measured mechanical force or movement corresponds to one or more predetermined forces or movements; and energize the one or more LEDs to emit light having one or more properties selected based on the determination.

In various embodiments, at least one of the one or more predetermined forces or movements is associated with a particular physical region of the luminaire. In various embodiments, the controller is further configured to transition to a learning state in which the controller monitors one or more characteristics of the signal from the accelerometer over a learning time interval and generates the predetermined forces or movements based on the monitored one or more characteristics. In some versions of these embodiments, the controller is further configured to selectively energize the one or more LEDs to prompt a user to apply mechanical force to or to move the luminaire during the learning time interval. In various versions, the controller is further configured to select, based on the signal from the accelerometer during the learning time interval, a property of light to which a predetermined force or movement is assigned.

Also, in various versions of these embodiments, the LED-based lighting unit further includes a wireless communication interface. The controller may be configured to select, based on one or more instructions received at the wireless communication interface from a remote computing device, a property of light to which a predetermined force or movement is assigned.

In various embodiments, the controller is configured to determine that the measured force or movement corresponds to the one or more predetermined forces or movements based at least in part on one or more physical properties of the luminaire. In various versions, the LED-based lighting unit further includes a user interface that is operable to provide, for use by the controller, an indication of the one or more physical properties of the luminaire. In various versions, the LED-based lighting unit further includes a communication interface operably coupled with the controller, wherein the controller is configured to receive, via the communication interface, an indication of the one or more physical properties of the luminaire.

The controller may be further configured to determine the one or more physical properties of the luminaire based on the signal from the accelerometer. In various versions, the accelerometer is a three axis accelerometer, and the controller is further configured to determine one or more physical properties of the luminaire based on how gravity acts on the luminaire. In various versions, the controller is further configured to estimate a rigidity or density of at least a portion of the luminaire based on evaluation of an impulse response sensed in the signal from the accelerometer. Also, the controller may further be configured to: energize the one or more LEDs over a sequence of time intervals so that during each time interval, the plurality of LEDs emit light having one or more different properties; and freeze the sequential energizing during a time interval in which the controller determines, based on the signal from the accelerometer, that the measured force or movement of the luminaire corresponds to the one or more predetermined forces or movements. In addition, or alternatively, yet, the controller may further be configured to: identify, based on the measured force, a physical region of the luminaire to which mechanical force was applied; and select, based on the identified physical region, a property of light emitted by the one or more LEDs to alter in response to a determination that the measured force corresponds to one or more predetermined forces.

In various embodiments, the LED-based lighting unit further includes a microphone coupled with the controller, wherein the controller is configured to determine that the measured mechanical force or movement of the luminaire corresponds to the one or more predetermined forces or movements based further on a signal from the microphone.

In various embodiments, the controller is further configured to determine, based on the signal from the accelerometer, a vector representative of the measured mechanical force or movement. In various versions, the controller is further configured to select one or more properties of light emitted by the one or more LEDs based on the vector representative of the mechanical force applied to or the movement of the luminaire. In various versions, the measured mechanical force or movement of the luminaire is a first measured mechanical force or movement of the luminaire, the vector is a first vector, and the controller is further configured to: determine, based on the signal, a second vector representative of a second measured force or movement of the luminaire; and select the one or more properties of light emitted by the one or more LEDs based on a spatial relationship between the first and second vectors.

In various embodiments, the LED-based lighting unit further includes a gyroscope, and the controller is configured to determine that the measured force or movement of the luminaire corresponds to the one or more predetermined forces or movements based further on a signal from the gyroscope.

In various embodiments, the LED-based lighting unit further includes at least one elongate member extending outwardly from a housing of the lighting unit. In various versions, the at least one elongate member extends outwardly at an angle such that a portion of the elongate member is accessible below a lampshade of the luminaire. In various versions, the at least one elongate member extends from the lighting unit to physically contact a portion of the luminaire. In various versions, the portion is a portion of a lampshade associated with the luminaire.

In various versions, the at least one elongate member comprises a plurality of elongate members that extend from the lighting unit to physically contact a plurality of portions of the lampshade, wherein the controller is configured to identify, based on the signal from the accelerometer, an elongate member of the plurality of elongate members to which mechanical force was applied. In various versions, the controller is further configured to select, based at least in part on the identified elongate member, the property of light emitted by the one or more LEDs. In various versions, a magnitude or degree of the selected property of light is selected based on the identified elongate member.

In various embodiments, the controller is further configured to: determine, based on the signal from the accelerometer, a magnitude of the measured force or movement; and select, based on the determination, the one or more properties of the emitted light. In various embodiments, the controller is further configured to transition to a learning state in which the controller generates and transmits, to a remote computing device, data indicative of one or more characteristics of the signal from the accelerometer over a learning time interval, wherein the data indicative of the signal is generated to facilitate rendering, by the remote computing device, feedback about the measured force or movement.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

The term "lighting fixture" or "luminaire" is used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit. The term "luminaire" is used herein to refer to a lighting fixture, lamp, or other device into which a lighting unit may be installed. For example, a lighting unit in the form of an LED light bulb may be screwed into a socket of a luminaire such as a desk lamp, hanging lamp or standing lamp. The luminaire may be connected to a power source such as AC mains, and may be configured to, among other things, supply power to an installed lighting unit so that the light unit is capable of emitting light.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 6-8 depict example spaces against which one or more vectors representing one or more measured forces or movements may be compared to determine one or more properties of light to be emitted.

FIGS. 10-15 depict examples of mechanical structures that may be employed to enhance measurement and/or detection of applied forces or movements.

DETAILED DESCRIPTION

While lamps and luminaires exist that enable user to control emitted light with touch and clapping, such luminaires may need to be custom-built for such purposes, or equipped with expensive circuitry. It may not be possible, or at least practicable, to customize an existing, conventional luminaire to be operable by a user's touch (e.g., based on capacitance) or sound. Thus, there is a need in the art to enable ordinary and/or conventional luminaires to be converted to touch-controlled luminaires. More generally, Applicants have recognized and appreciated that it would be beneficial to provide mechanisms for enabling users to control light output of lighting units without requiring the luminaires, housing such lighting units, to be customized. For example, mechanisms and techniques are disclosed that facilitate user interaction at an outer portion of luminaires and detection of that interaction at a central part of the luminaire, for instance by a sensor that is co-located with the light-generating module.

Figure 1:
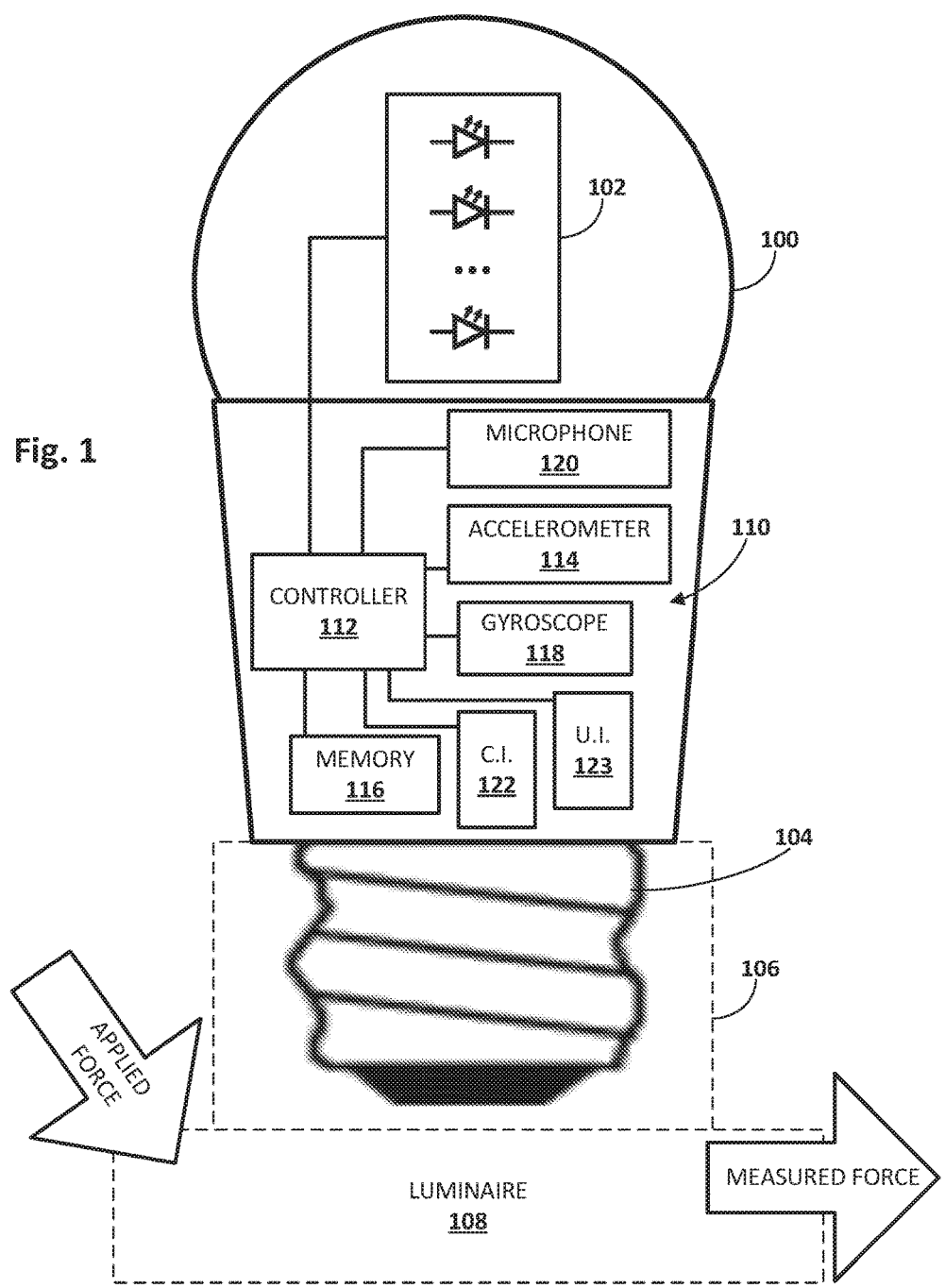
FIG. 1 illustrates schematically example components of a lighting unit, in accordance with various embodiments.

Referring to FIG. 1, in one embodiment, a lighting unit 100 may include one or more light sources 102, which in FIG. 1 are in the form of a plurality of LEDs. Lighting unit 100 may include a luminaire installation interface 104, which may be screwed or otherwise inserted into a socket 106 of a luminaire 108. Luminaire 108 in FIG. 1 is depicted purely schematically, and may take various forms, including but not limited to a stand up lamp, a hanging lamp, a ceiling light fixture (e.g., a traditional screw-in fixture for bulbs or a fluorescent lighting fixture), a track lighting fixture, and so forth.

Lighting unit 110 may include control circuitry 110 for performing various operations relating to lighting control. A controller 112 may be operably coupled (e.g., via a bus or another communication pathway known in the art) to an accelerometer 114. Accelerometer 114 may come in various forms, such as a two- or three-axis accelerometer or a simple tilt sensor, and may be configured to detect movement in various axes and provide a corresponding signal(s) to controller 112. When lighting unit 100 is installed in luminaire 108, measured forces or movements caused by mechanical force applied to luminaire 108 (indicated by arrows in FIG. 1) may be detected by accelerometer 114. Thus, and as will be discussed throughout this disclosure, installation of lighting unit 100 into luminaire 108 may, in effect, convert luminaire 108 into a touch-controllable luminaire without requiring that a surface of luminaire be capacitive or requiring other customization of luminaire 108.

For example, in various embodiments, controller 112 may be configured to receive, from accelerometer 114, a signal representative of a one or more measured forces or movements caused by applied forces to or movements of luminaire 108 in which lighting unit 100 is installed. Controller 112 may determine, based on the signal from accelerometer 114 (and in some instances, one or more physical properties of luminaire 108), that the measured mechanical force or movement corresponds to one or more predetermined forces or movements that correspond to one or more lighting control commands.

For instance, impulse patterns representative of various predetermined forces or movements may be stored in memory 116. Controller 112 may compare a signal received from accelerometer 114 to these impulse patterns to determine which, if any, of the predetermined forces or movements has been measured. Assuming controller 112 finds an impulse pattern that corresponds to a signal from accelerometer 114 representing a measured applied force or movement, controller 112 may energize one or more light sources 102 to emit light having one or more selected properties. A signal from accelerometer 114 may correspond to an impulse pattern where it matches or comes close enough to the impulse pattern (e.g., within a predefined or user-controllable margin of error). Additionally or alternatively, a signal from accelerometer 114 may correspond to an impulse pattern where a force represented in the signal has an associated impulse response (e.g., how long a jerk associated with a detected acceleration takes to decrease to zero) that is similar (e.g., in duration) to that of a predetermined force or movement.

In some embodiments, in addition to or instead of determining whether a measured force or movement corresponds with a predetermined force or movement, controller 112 may determine, based on the signal from accelerometer 114, a magnitude of the measured force or movement. Controller 112 may then select, based on the determined magnitude, the one or more properties of the emitted light. For instance, a hard tap may correspond to high intensity and a soft tap may correspond to low intensity.

Controller 112 may be operably coupled with additional components to aide in touch-based lighting control. For instance, in some embodiments, a gyroscope 118 may be provided to detect rotational movement of luminaire 108. A signal from gyroscope 118 may be used by controller 112 in addition to or instead of a signal from accelerometer 114 to determine whether measured force or movement of luminaire 108 corresponds to an impulse pattern stored in memory 116 that represents a predetermined force or movement.

In some embodiments, controller 112 may be operably coupled with a microphone 120. A signal from microphone 120 may be used by controller 112 in addition to or instead of a signal from accelerometer 114 and/or gyroscope 118 to determine whether measured force or movement corresponds to an impulse pattern stored in memory 116 that represents a predetermined force or movement. For example, assume a small amount of force, such the type of applied force that may result from incidental contact with luminaire (e.g., by a user on accident or by a pet), is applied to luminaire 108. If controller 112 were to base its decision to alter to one or more properties of light emitted by one or more light sources 102 on the signal from accelerometer 114 alone, controller 112 might cause an alteration in lighting where none is intended. However, in embodiments with microphone 120, controller 112 may require that a measured force be accompanied by a sufficiently-loud sound detected by microphone 120 in order to trigger a change in one or more properties of light emitted by lighting unit 100.

In some embodiments, controller 112 may be operably coupled with a communication interface ("CI" in FIG. 1) 122 and/or a user interface ("UI" in FIG. 1) 123. Communication interface 122 may receive information and/or instructions over various wireless and/or wireless communication mediums. For instance, in some embodiments, communication interface 122 may be configured to communicate with remote computing devices using ZigBee, WiFi, near field communication (NFC), Bluetooth, and so forth. User interface 123 may take various forms, such as a plurality of dipswitches, one or more knobs or buttons, and so forth.

Communication interface 122 and/or user interface 123 may receive various types of instructions or settings from a user. In some embodiments, controller 112 may receive, e.g., via communication interface 122 and/or user interface 123, one or more instructions to select a property of light to which to a predetermined force or movement is assigned. For example, a user may instruct lighting unit 100 that when a particular type of force (e.g., that caused by running a finger along a particular portion of luminaire 108) is measured, controller 112 should cause one or more light sources 102 to emit light having a particular property (e.g., the farther a user runs her finger along the region, the more intense the emitted light shall be).

In some embodiments, a user may provide to controller 112, via communication interface 122 or user interface 123, various data about one or more physical characteristics of luminaire 108. For example, a user may use her smart phone to provide details about luminaire 108 (e.g., its size, shape, materials, or a model or serial number), or may take a picture of luminaire 108 with her smart phone and upload those pictures to controller 112. Controller 112 may use this data in combination with a signal from accelerometer 114, gyroscope 118 and/or microphone 120 to select one or more properties of light emitted by one or more light sources 102.

In some embodiments, controller 112 may transmit, over communication interface 122, a signal indicative of signals it receives from accelerometer 114, gyroscope 118 and/or microphone 120 to a remote computing device (e.g., a device forming part of a cloud). In this manner, controller 112 may delegate analysis of the signals, e.g., against one or more impulse patterns representative of applied forces or movements, to the remote computing device.

Figure 2:
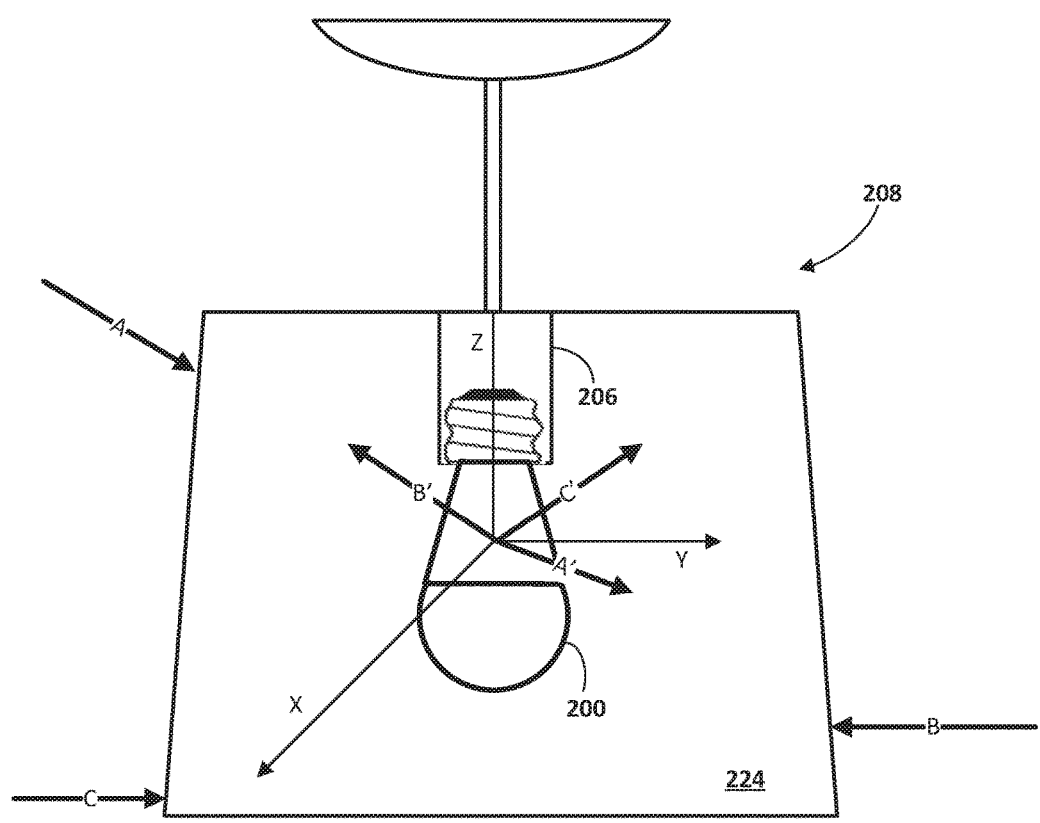
FIG. 2 depicts a lighting unit configured with selected aspects of the present disclosure installed in a hanging luminaire.

FIG. 2 depicts a hanging luminaire 208 with an installed lighting unit 200 that is similar to lighting unit 100 of FIG. 1 installed into a socket 206. The arrows A', B' and C' represent measured forces that may result from three applied forces, A, B and C, respectively. When a horizontal force such as B or C is applied near the bottom of a lamp shade 224 of luminaire 208, the measured forces B' and C' tend to include at least some of a horizontal component of the originally applied force, as well as a vertical component (upwards in FIG. 2) that is induced by the hanging structure of luminaire 208. When a force with a horizontal component is applied closer to the top of lamp shade 224, e.g., as shown by arrow A, the measured force A' may again track the original force's horizontal component, but may also include some of the originating force's vertical component as well.

If controller 112 measures force A' (indicating that force A was applied to lamp shade 224), controller 112 may cause lighting unit to emit light having a first property (e.g., on/off, a particular color or saturation, etc.). If controller 112 measures force B' (indicating that force B was applied to lamp shade 224), controller 112 may cause lighting unit to emit light having a second property. In some embodiments, controller 112 may analyze a difference between an applied force (e.g., A, B, C) and a resulting movement (e.g., A', B', C'), which may be referred to as a translation function. A translation function may remain consistent over a multitude of measurements.

Figure 3:
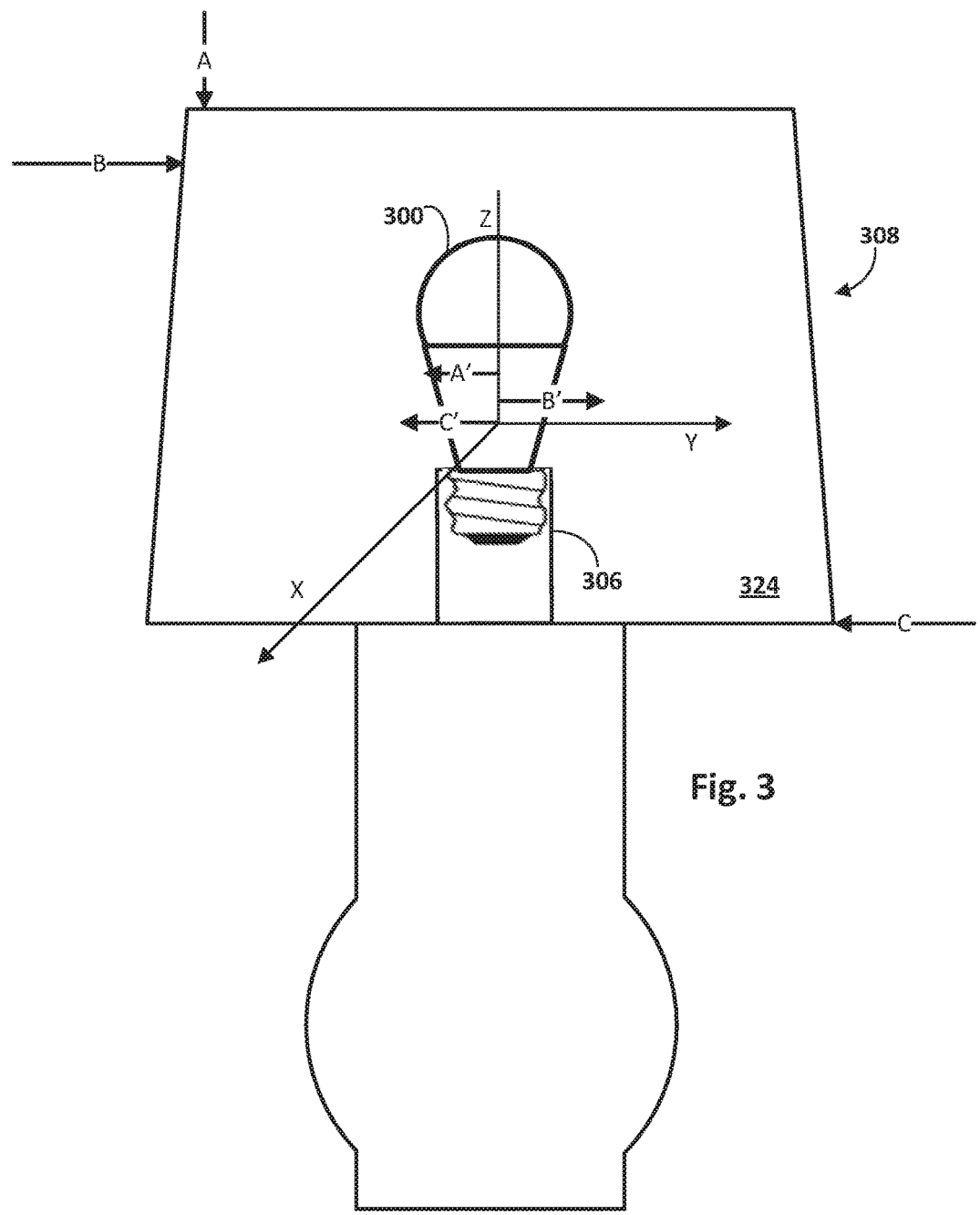
FIG. 3 depicts a lighting unit configured with selected aspects of the present disclosure installed in a standing luminaire.

FIG. 3 depicts a luminaire 308 in the form of a standing lamp with an installed lighting unit 300 that is similar to lighting units 100 and 200 of FIGS. 1 and 2, respectively. As was the case with FIG. 2, the arrows A, B and C demonstrate three example forces applied to luminaire 308 and/or its lampshade 324, and three arrows A', B' and C', respectively, represent the resulting measured forces. Because luminaire 308 has less freedom of movement than the hanging luminaire 208 of FIG. 2, particularly in the Z direction, all three measured forces lie on the X-Y plane. For the sake of clarity and visibility, measured forces A', B' and C' are offset slightly from each other along the Z axis. As before, controller 112 may be configured to select one or more properties of light to be emitted by lighting unit 300 based on which resulting force, A', B' or C', is measured.

Figure 4:
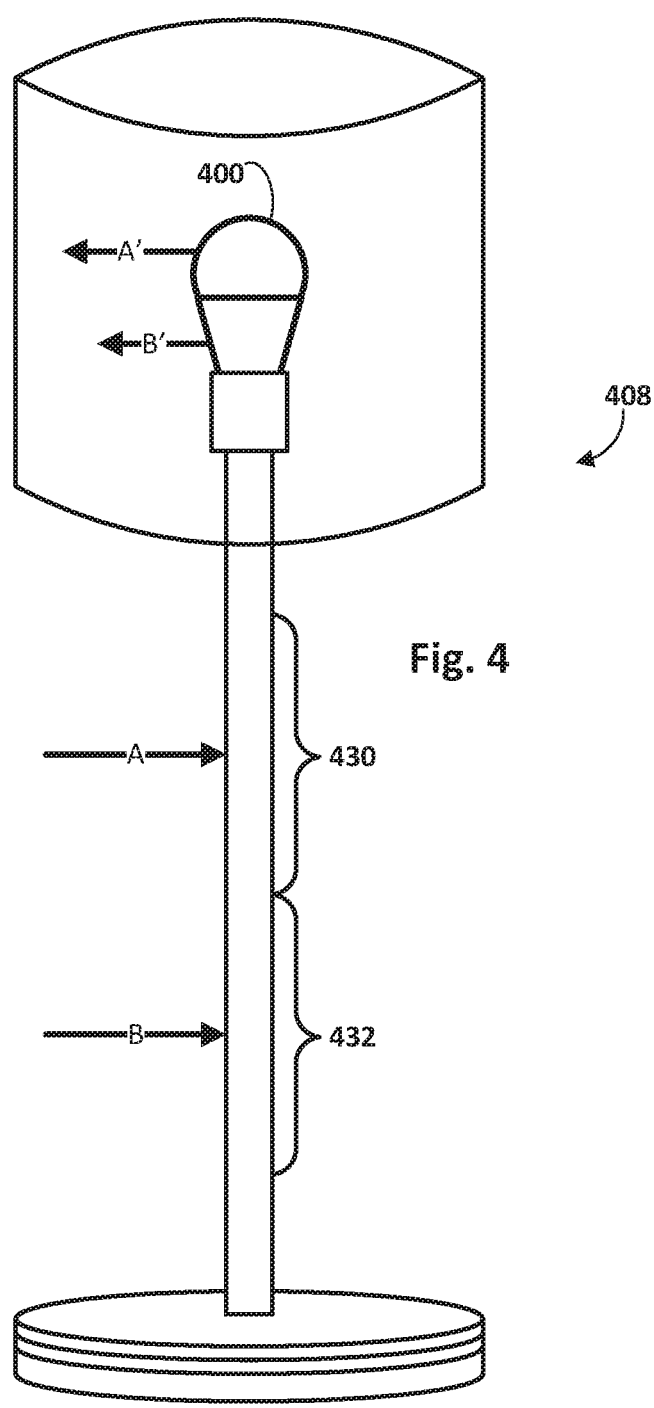
FIG. 4 depicts a lighting unit configured with selected aspects of the present disclosure installed in another standing luminaire.

In various embodiments, one or more predetermined forces or movements may be associated with a particular physical region of a luminaire. Referring to FIG. 4, another standing luminaire 408 is depicted with an installed lighting unit 400 configured with selected aspects of the present disclosure. A shaft of luminaire 408 includes a first region 430 and a second region 432 that may have different densities, rigidities, etc., caused by different materials, fillers (e.g., solid fill versus hollow, sand, chalk, foam, etc.). In various embodiments, these differing rigidities/densities may be determined, e.g., by a lighting unit controller, by evaluating a signal from an accelerometer to measure impulse responses (e.g., including their duration) to forces applied to luminaire 408.

A controller (not depicted in FIG. 4) of lighting unit 400 may use data about the physical properties of regions 430 and 432 to determine where on luminaire 408 a mechanical force was applied. Additionally or alternatively, a microphone may provide a signal that the controller may use to increase its accuracy and/or robustness in determining which region was acted upon. For instance, the sound of a tap may vary depending on the hollowness of luminaire 408 in the region in which it was tapped. In some embodiments, the controller may analyze signals from multiple accelerometers deployed in multiple locations in luminaire 408, e.g., to increase accuracy and/or robustness. However, this is not required, and in many cases the sole detector of movement may be one or more accelerometers and/or gyroscopes in the lighting unit 400.

In FIG. 4, two mechanical forces of approximately equal amplitude (e.g., two equally strong taps) are represented by arrows A and B. Force A was applied to first region 430 and force B was applied to second region 432, to cause measured forces A' and B', respectively. The controller may determine, based on measures forces A' and B', as well as data about the physical properties of regions 430 and 432, which region was tapped. The controller may select one or more properties of light emitted by lighting unit 400 based on this determination. For instance, a tap in first region 430 may toggle lighting unit 400 between on and off, while consecutive taps in second region 432 may cause lighting unit 400 to toggle through various levels of emitted brightness.

In some embodiments, impulse response sensed by an accelerometer may be used to determine one or more physical properties of a luminaire. For instance, rigidity and/or density of all or a portion of a luminaire may be determined by evaluating an amount of variation in a signal from an accelerometer after a force is applied. A rigid luminaire may exhibit an impulse response having a shorter duration than a less rigid, more "wobbly" luminaire. Put another way, the jerk (derivative of acceleration) exhibited by the rigid luminaire may decrease to zero faster than the jerk exhibited by the more wobbly luminaire.

Figure 5A:
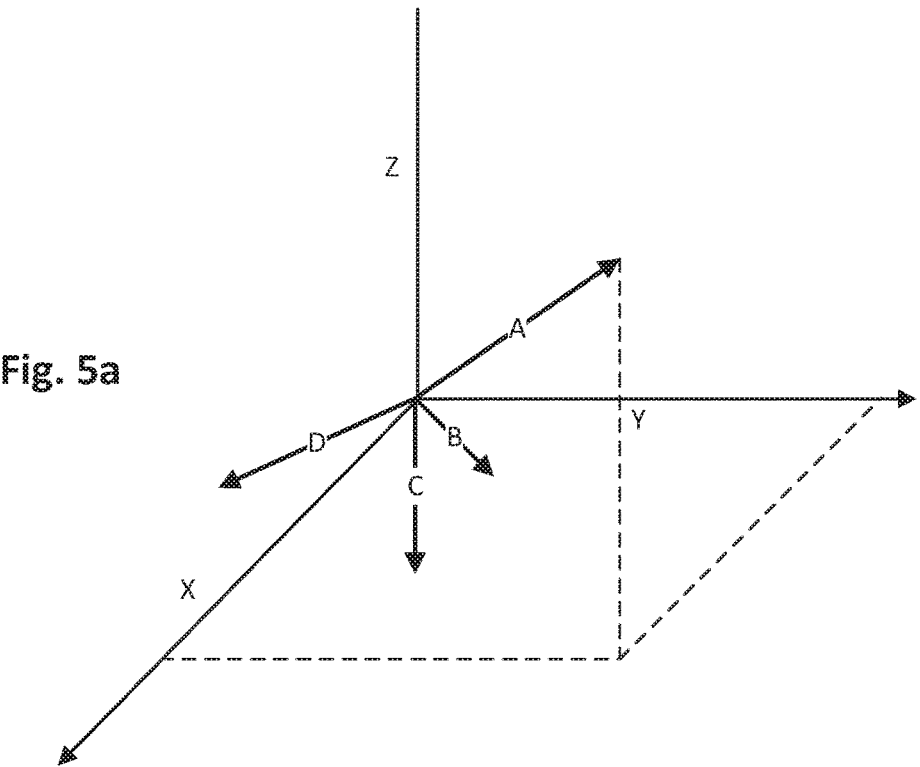
FIGS. 5a-b depicts an example of how a lighting unit configured with selected aspects of the present disclosure may calculate a vector that represents a measured force or movement.

In some embodiments, a plurality of forces may be applied to a luminaire in sequence to dictate how one or more properties of emitted light are selected. In such case, in addition to or instead of individual predetermined forces and movements, memory 116 may store sequences of predetermined forces and movements. For instance, and referring to FIGS. 5a and 5b, four measured forces A-D have been detected by a controller (e.g., controller 112) and are represented as vectors in a three dimensional space. The forces were measured in sequence, A→B→C→D. In various embodiments, this sequence of measured forces may be used by a controller of the lighting unit as input for a state machine associated with lighting control. For instance, a user may apply a particular sequence of forces to the luminaire. The corresponding sequence of measured forces may be used by the controller to navigate through nodes and branches of a logic tree, e.g., based on magnitudes and angles of the detected vectors, to cause one or more properties of light to be emitted or not emitted.

Figure 5B:
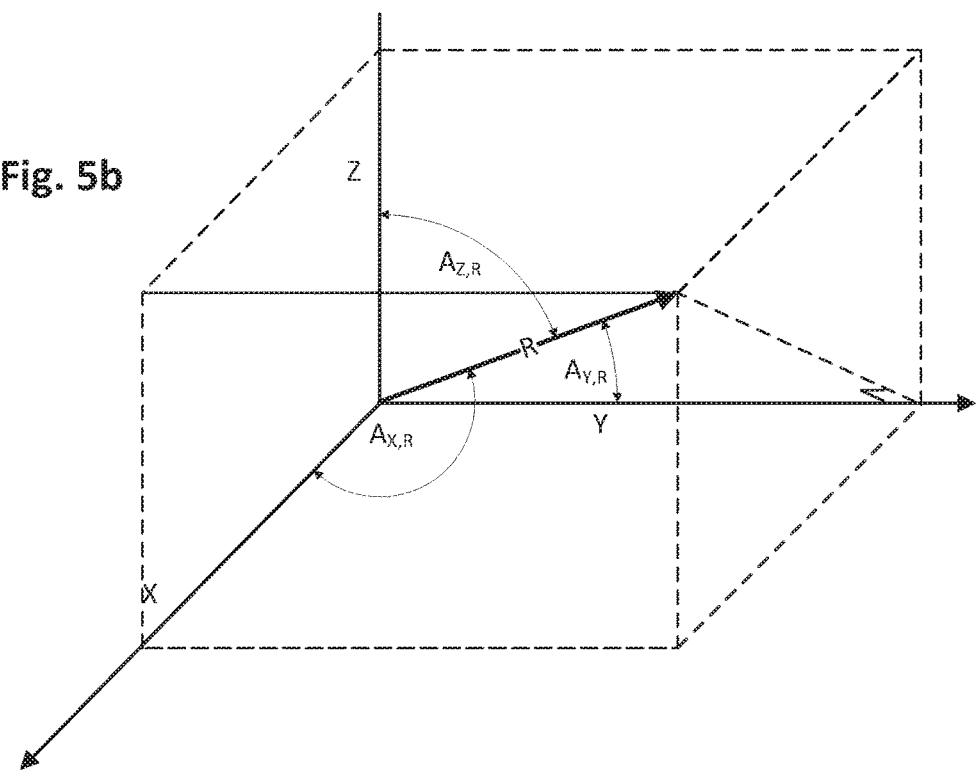

An example of how a magnitude and angle of a vector may be determined is depicted in FIG. 5b. A vector R (which could be any one of A, B, C or D in FIG. 5a) is depicted along with its constituent angles $A_{X,R}$, $A_{Y,R}$, and $A_{Z,R}$. In various embodiments, the amplitude of the vector R may be calculated using an equation such as the following:

$$R=\sqrt{(R_x^2+R_y^2+R_z^2)}$$

where $R_i$ is measured acceleration in the i-th axis, e.g., as reported by an accelerometer. Once the amplitude of R is known, the angles $A_{X,R}$, $A_{Y,R}$, and $A_{Z,R}$ may be calculated, e.g., using equations such as the following:

$$A_X=\arccos(R_X/R)$$

$$A_Y=\arccos(R_Y/R)$$

$$A_Z=\arccos(R_Z/R)$$

wherein $A_i$ is the angle of the vector towards the i-th axis.

In various embodiments, a controller may select a property of light to be emitted by a lighting unit based on one or more characteristics of one or more vectors representing one or more measured forces or movements of a luminaire. For example, FIGS. 6a and 6b depict two similar three dimensional spaces in which one or more volumes are defined. Each volume may represent a particular property of light. In some embodiments, each volume may represent a space of potential values for a particular lighting property. For example, a volume may represent a color space. The manner in which a vector representing a particular measured force or movement passes through and/or ends in a volume may dictate how a property of light associated with that volume will be affected.

FIG. 7 depicts an alternative embodiment where the volumes are squares, rather than the lobes depicted in FIGS. 6a and 6b. FIG. 8 depicts in two dimensions a "bulls eye" of value ranges. A particular lighting property of light to be emitted may be selected, for instance, based on the ring in which a vector terminates. The stronger the amplitude of the vector (e.g., the harder the user taps on the luminaire), the further the representative vector will pass through the rings of FIG. 8.

In some embodiments, a controller may perform various actions based on relationships between initial vectors and subsequent vectors. For instance, a controller may select one or more properties of light emitted by one or more light sources based on a comparison (e.g., spatially, temporally) between an initial, reference vector and subsequent vectors, e.g., detected within a predetermined time interval of the initial vector. In various embodiments, the predetermined time interval after the initial vector in which subsequent vectors may be detected may be absolute (e.g., five seconds). In other embodiments, the predetermined time interval may restart each time a new vector is detected. After expiration of such a time interval, any newly detected vector may be considered a new initial vector. In some embodiments, there may be no time interval, and each newly detected vector may act as a reference vector for the next detected vector.

Assume, for instance, that a user first taps a lamp at a central location to turn it on. The vector representing the applied force of that tap may be stored as a reference vector. A controller of a lighting unit installed in the lamp may then interpret subsequent taps on one side of the initial tap as instructions to increase a property (e.g., brightness) of light emitted by the lighting unit, and taps on the other side of the initial tap as instructions to decrease the property of light emitted by the lighting unit. In this manner, it may be intuitive for a user to cause a lighting unit installed in a luminaire to emit light having a particular property, and then to alter a value of that property based on locations of subsequent user contact with the luminaire.

A user may be able to adjust more than brightness in this manner. For instance, a user may select a lighting property she wishes to control by tapping the luminaire in a particular manner (e.g., double tap), tapping the luminaire at a particular location, or by tapping the luminaire a number of times to toggle through various lighting property control modes (e.g., brightness control, correlated color temperature (CCT) control, presets, etc.) until she arrives at a lighting property she wishes to control. After selecting a lighting property to adjust, the lighting unit may emit light in a manner to indicate to the user which mode is now controllable. For instance, if the user selects CCT control, the lighting unit may change its emitted temperature from cold to warm within a few seconds. The user can then tap on either side of an initial tap to increase or decrease CCT.

As another example, assume a user selects hue control. The user's next tap of the luminaire may cause an installed lighting unit to emit a hue (e.g., yellow) near the middle of the color spectrum. The vector representing that tap may be stored as a reference vector. The user may subsequently tap to one side or the other (or above or below) of where she initially tapped to move the hue of the emitted light down (e.g., towards red) and up (e.g., towards blue) the color spectrum, respectively.

In other embodiments, instead of defining a "center" with an initial tap, the center of the luminaire may be determined, e.g., using a range of lighting property values indication mechanism such as a dial that is rotatable about the luminaire. Taps on either side of the set center of the luminaire may be interpreted as instructions to increase or decrease a particular lighting property.

Relationships between vectors that may be considered when selecting one or more properties of light to emit are not limited to spatial relationships. In some embodiments, a temporal relationship between vectors may be considered. For instance, in some embodiments, a vector representing an initial measured force (e.g., a user taps in a particular region) may cause a controller to energize one or more light sources over a sequence of time intervals so that during each time interval, the one or more light sources emit light having one or more different lighting properties. The controller may then await further user input, e.g., in the form of subsequent vectors representing subsequent measured forces. In some cases, when the user taps the luminaire again, the controller may freeze the sequential energizing. Emitted light may thereafter continue to have the lighting properties present during the time interval in which the user provided the subsequent tap.

As noted above, a lighting unit controller may transition to a learning state in which the controller learns about physical properties of the luminaire in which the lighting unit is installed, one or more predetermined forces and/or movements of the luminaire in which it is installed, and/or selected lighting properties, the control of which is to be associated with the one or more predetermined forces and/or movements.

For instance, while in the learning state, the lighting unit controller may monitor one or more characteristics of one or more signals received from accelerometers, gyroscopes, and so forth, over a time interval. The controller may then generate and/or record impulse patterns and/or impulse responses representing various predetermined forces or movements based on the monitored one or more characteristics. The controller may subsequently compare measured forces and/or movements of the luminaire against these predetermined forces and/or movements to select one or more properties of light to emit. While in the learning state, a controller may prompt a user to apply force to a luminaire so that the controller may learn the resulting measured force for future reference. For instance, in some embodiments, the controller may selectively energize one or more light sources (e.g., 102 in FIG. 1) to prompt a user to apply mechanical force to the luminaire.

In some embodiments, the controller may select which property of light to which a predetermined force or movement is to be assigned based on a signal from the accelerometer, a gyroscope and/or a microphone. For instance, if a user wishes to record one or more predetermined forces that will be used to adjust brightness, the user may tap or otherwise apply force to or move the luminaire in a manner that will match a predetermined force or movement associated with brightness adjustment, to cause the luminaire to enter a learning mode for brightness adjustment. Additionally or alternatively, the user may cause the controller to enter the learning mode by providing an instruction at a remote computing device such as a smart phone or tablet computer, which may be received at a communication interface (e.g., 122 in FIG. 1) of the lighting unit.

Figure 9:
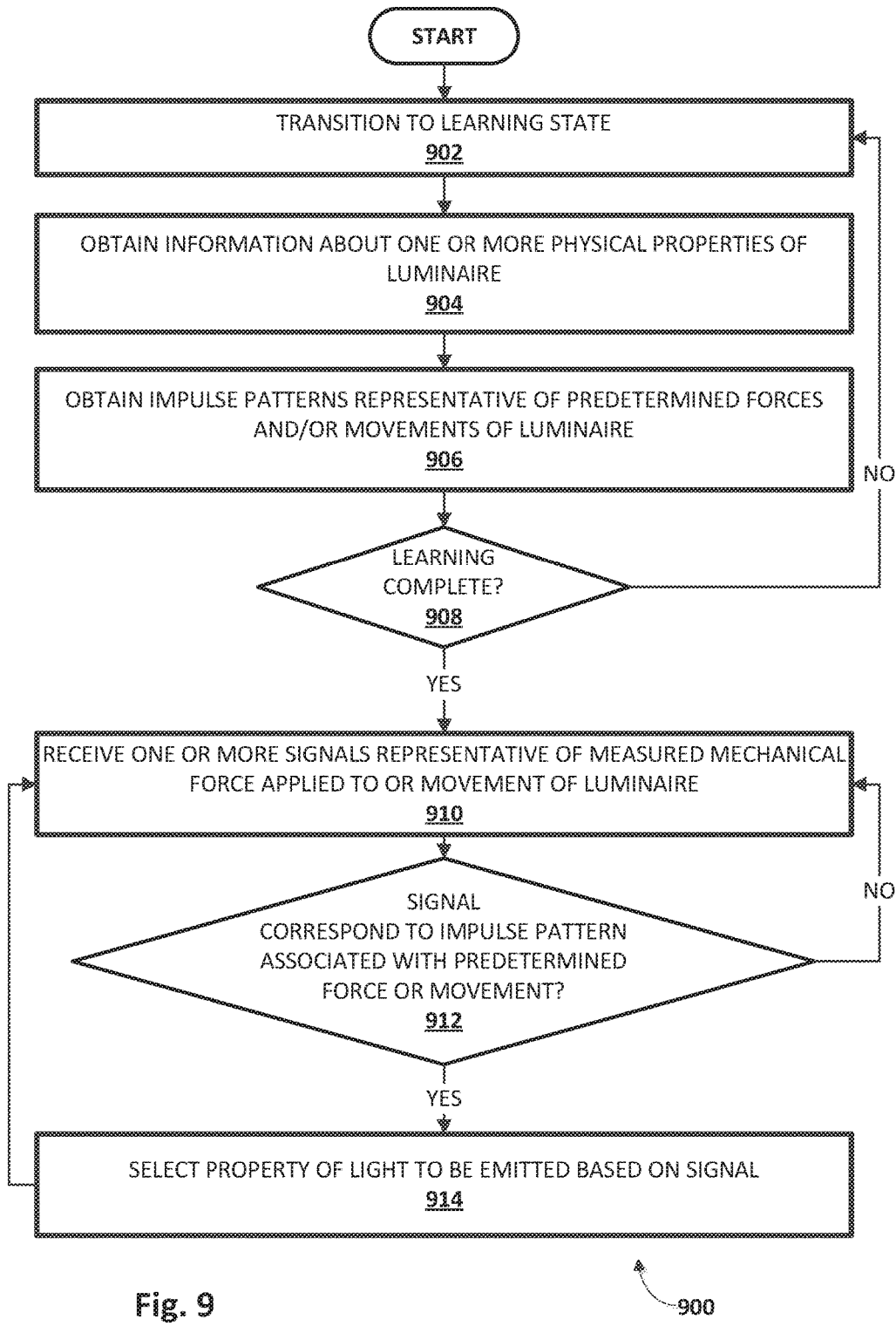
FIG. 9 depicts an example method that may be performed by/with a lighting unit configured with selected aspects of the present disclosure.

FIG. 9 depicts an example method 900 that may be performed with a lighting unit configured with selected aspects of the present disclosure, such as 100, 200, 300 and/or 400, in accordance with various embodiments. While many of these operations may actually be performed by a component of the lighting unit, such as by its controller, for the sake of brevity, operations will be described as being performed by the lighting unit in general. Moreover, while these operations are depicted in a particular order, this is not meant to be limiting. One or more operations may be reordered, added or omitted in accordance with various embodiments. In some embodiments where the lighting unit is already installed, operations may begin instead at block 910.

At block 902, the lighting unit may transition to a learning state. The lighting unit may transition into the learning state in response to various events, such as the lighting unit being energized, the lighting unit being installed into a luminaire for the first time, a reset button being pressed, a toggle switch being actuated, a power switched being toggled, or in response to a user request (e.g., which may be provided in the form of a tap or another mechanical force or movement). In some embodiments, the lighting unit may transition into the learning state in response to a mechanical switch that releases charge from a capacitor when the lighting unit is removed from the socket of the luminaire. In some embodiments, the lighting unit may detect one or more forces with amplitudes below a threshold. In some embodiments, the lighting unit may detect difference in harmonics and determine that it has been installed into a new luminaire.

At block 904, the lighting unit may obtain information about one or more physical properties of the luminaire in which it is installed. For example, and as described above, the lighting unit may prompt a user (e.g., by energizing one or more light sources) to apply one or more mechanical forces to luminaire, e.g., at various locations. The lighting unit may monitor a signal from an accelerometer and based on one or more forces measured in that signal, make various determinations about one or more physical properties of the luminaire. For instance, the lighting unit may measure duration of an impulse response to determine a rigidity and/or density of the luminaire.

In some embodiments, the lighting unit may be able to obtain an identifier associated with the luminaire, e.g., via a user input or by wireless means (e.g., ZigBee, WiFi, BlueTooth, NFC). Based on this, the lighting unit may cross reference this identifier against a database on known luminaires to determine which luminaire it is installed in, as well as one or more physical properties of the luminaire. Additionally or alternatively, a user may take a picture of the luminaire using a camera of a smart phone or tablet computer, and may transmit the image to the lighting unit. The lighting unit may perform image analysis on the image to determine one or more physical properties of the luminaire. In some embodiments, the smart phone or tablet computing device may instead perform the analysis itself, or may delegate it to a remote computing device such as a server.

At block 906, the lighting unit may obtain one or more impulse patterns associated with predetermined forces or movements that are meant to cause the lighting unit to energize its light source in particular ways. For instance, the lighting unit may prompt a user to apply a mechanical force that the user wishes to cause the lighting unit to emit light having a particular property. The lighting unit may then monitor a signal from its accelerometer for a predetermined time interval. Any force or movement measured during the predetermined time interval that, for instance, deviates from a baseline by more than a standard deviation, may be recorded as an impulse pattern and assigned to the particular lighting property. In some embodiments, the lighting unit may blink or otherwise provide a visible signal to the user that the lighting unit has learned the applied force. Additionally or alternatively, the lighting unit may provide other forms of feedback, such as cycling through various possible values of a given lighting property being programmed. In some embodiments, a particular applied force or movement may cause the lighting unit to transition between lighting properties to be learned. For instance, a double tap—two taps within a predetermined time interval—may indicate that the user wishes to transition to a new lighting property.

In some embodiments, the user may use her smart phone or tablet computer to assist with the learning process. For instance, the lighting unit may provide feedback in the form of data transmitted to the user's smart phone or tablet computer. The user may see, e.g., graphically, how her taps or other applied forces are actually detected by the lighting unit. In this way, the user can see if, for instance, a region of a luminaire she is tapping is not well-suited for providing vibration that an accelerometer can detect (e.g., because it is soft or otherwise dampened). In some embodiments, the user may be able to provide instructions to the lighting unit controller that adjust, e.g., a sensitivity of the lighting unit accelerometer (e.g., by moving a slider).

At block 908, it may be determined whether the lighting unit is finished learning about physical properties of the luminaire and/or predetermined forces or movements. For instance, the predetermined time interval mentioned with reference to block to 906 may run out, and the user may not provide any additional input indicating that the user wishes to program the lighting unit further. If the answer at block 908 is no, then method 900 may proceed back to block 902 (or 904 or 906). If the answer at block 908 is yes, however, then method may proceed to block 910.

At block 910, the lighting unit may receive one or more signals from one or more components (e.g., accelerometer, gyroscope, microphone, etc.). These signals may be indicative of one or more measured forces resulting from forces applied to or movements of the luminaire in which the lighting unit is installed. At block 912, the lighting unit may determine whether the received one or more signals correspond to one or more impulse patterns representative of one or more predetermined forces or movements, e.g., learned at block 906. If the answer is no, then method 900 may proceed back to block 910. If the answer is yes, however, then method may proceed to block 914. At block 914, the lighting unit may select one or more properties of light (e.g., brightness, hue, saturation, intensity, etc.) to be emitted by one or more light sources. Method 900 may then proceed back to block 910.

In another aspect, various mechanical extensions may be deployed between a lighting unit equipped with selected aspects of the present disclosure and a luminaire in which the lighting unit is installed. These extensions may serve to transfer applied mechanical force and/or movement from the luminaire to one or more motion detecting elements (e.g., accelerometer, gyroscope, etc.) of the lighting unit, e.g., to enable measured forces and movements to be more accurate and/or granular.

Figure 10:
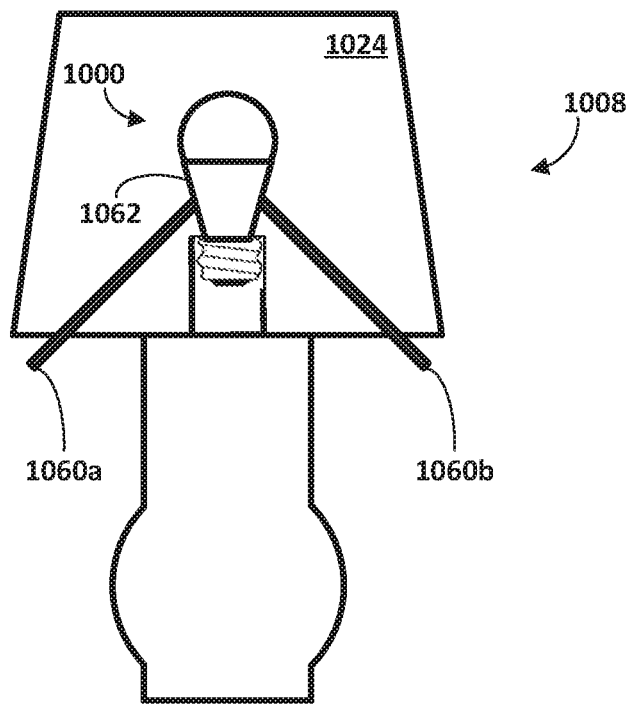

For example, in FIG. 10, a lighting unit 1000 may include, in addition to components described above with reference to FIG. 1, elongate members 1060 extending outwardly from a housing 1062 of lighting unit 1000. In various embodiments, the elongate members 1060*a-b* may extend outwardly at an angle such that a portion of each elongate member 1060 is accessible below a lampshade 1024 of a luminaire 1008. That way, a user may physically interact with the elongate member (e.g., by tapping it, pulling it, twisting it, snapping it, or otherwise moving it) to control one or more properties of light emitted by lighting unit 1000. In some embodiments, each of elongate members 1060*a-b* may be constructed to have a distinct vibration profile, such that a controller may be able to identify which elongate member 1060 was interacted with based on a signal from an accelerometer.

Figure 11:
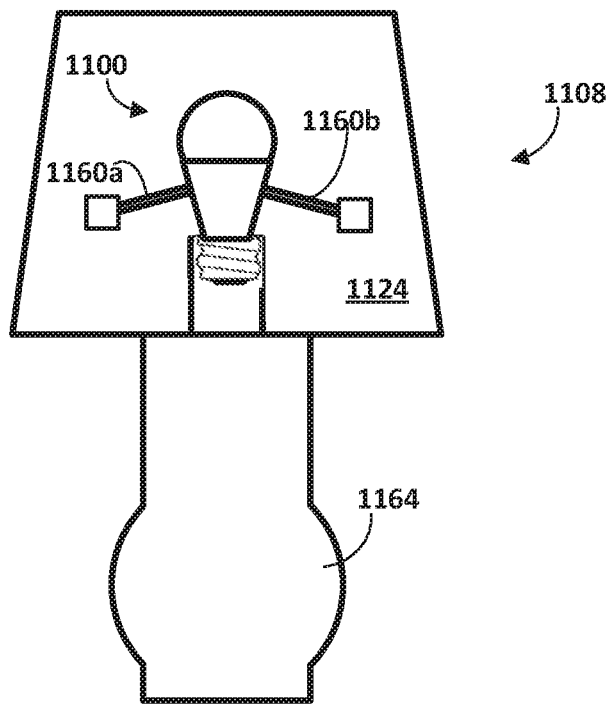

FIG. 11 depicts another embodiment in which a lighting unit 1100 includes a plurality of elongate members 1160*a-b*. Each elongate member 1160 extends from lighting unit 1100 to physically contact a portion of luminaire 1108. In this particular instance, the portions to which each elongate member 1160 extends is a portion of a lampshade 1124 associated with luminaire 1108. However, elongate portions 1160 may extend to physically contact other portions of luminaire, such as its base 1164. Establishing physical contact between an elongate member 1160 and a portion of luminaire 1108 may enhance an ability of an accelerometer (not depicted in FIG. 11) of lighting unit 1100 to detect mechanical force applied to luminaire 1108. Establishing physical contact between a plurality of elongate members 1160 and a plurality of portions of luminaire 1108 may further enhance this ability, and may also facilitate determination by a controller (not depicted in FIG. 11) of where on luminaire 1108 mechanical force (e.g., a tap) was made, e.g., by which elongate member 1160 experienced the applied force most strongly.

FIGS. 12-15 depict variations of lighting units with elongate members extending from a lighting unit to portions of a luminaire. As shown in the top-down view on the left side of FIG. 12, a plurality of elongate members 1260*a-g* extend from lighting unit 1200 to lampshade 1224. Elongate members 1260*a* and 1260*g* are somewhat distanced from elongate members 1260*b-f*. The elongate members 1260*a-g* may be configured this way, for instance, so that mechanical forces applied to a portion of lampshade 1224 contacted by elongate members 1260*a* or 1260*g* causes a controller (not depicted in FIG. 12) to select a property of light emitted by lighting unit 1200 to control, whereas mechanical forces applied to a portion of lampshade 1224 contacted by elongate members 1260b-f may cause the controller to select an amplitude or degree of the selected lighting property to emit. Other variations of lighting control with the elongate members 1260a-g depicted in FIG. 12 are possible, as well.

FIG. 13 is a top down view of another embodiment of a luminaire 1308 in which a plurality of elongate members 1360a-f extend from an installed lighting unit 1300 to a lampshade 1324. Mechanical force applied to each elongate member 1360 may cause a controller (not depicted in FIG. 13) to control light emitted by lighting unit 1300 in various ways. For instance, each elongate member 1360 may be associated with a particular color. A user may apply mechanical force to a portion of lampshade 1324 contacted by an elongate member 1360 to cause lighting unit 1300 to emit light of a corresponding color. In some embodiments, indicia such as a color wheel or gradient may be printed on lampshade 1324 or elsewhere on a luminaire to assist a user in selecting which portion of lampshade 1324 to tap FIG. 14 is a top-down view of an embodiment of a luminaire 1408 in which a plurality of elongate members 1460a-i extend from a plurality of installed lighting units 1400a-c to physically contact a lampshade 1424. In some instances, each lighting unit 1400a-c may be configured with selected aspects of the present disclosure. In other instances, less than all of the lighting units 1400a-c may be configured with selected aspects of the present disclosure. In some embodiments, an accelerometer (not depicted in FIG. 14) associated with a particular lighting unit 1400 may detect more strongly mechanical force applied to elongate members 1460 to which it is in direct physical contact than mechanical force applied to elongate members to which it is not. For instance, while first lighting unit 1400a may detect some mechanical force applied to elongate members 1460d-i, it may most strongly detect (e.g., a signal it receives from an accelerometer may exhibit the highest amplitude) mechanical force applied to elongate members 1460a-c because they are in more direct physical contact with first lighting unit 1400a than elongate members 1460d-i.

In some embodiments, one of plurality of lighting units 1400a-c may be configured to respond only to measured forces resulting from mechanical force applied to elongate members 1460 in direct physical contact with the one of plurality of lighting units 1400a-c. In some embodiments, one of plurality of lighting units 1400a-c may be configured to give priority to user input (e.g., taps) applied to elongate members 1460 in direct physical contact over user input provided at elongate members 1460 not in as direct physical contact. For instance, if lighting unit 1400a receives on instruction via a tap at elongate member 1460b, and a conflicting or contradictory instruction at elongate member 1460e, lighting unit 1400a may ignore the conflicting or contradictory instruction, or may ensure that light it emits is affected less by the conflicting or contradictory instruction than by the instruction received at elongate member 1460b. In various embodiments, multiple lighting units installed in a single luminaire, such as lighting units 1400a-c, may be configured to communicate with each other (e.g., using coded light or ZigBee) to ensure that instructions received at various elongate members 1460 are applied appropriately.

FIG. 15 depicts an alternative embodiment of a luminaire 1508 with an installed lighting unit 1500 configured with selected aspects of the present disclosure. In this instance, a plurality of elongate members 1560 extend from lighting unit 500 to end flat end portions 1566. A user may apply mechanical force to one or more of the flat end portions 1566 to cause movement of elongate members 1560. As described throughout the present disclosure, lighting unit 1500 may determine whether the resulting measured force or movement corresponds to a predetermined force or movement, and may control emitted light accordingly. In various embodiments, flat end portions 1566 may be light diffusive, transparent, translucent, opaque, reflective, and so forth. In some embodiments, a subset of all elongate members 1560 may be interactive (e.g., tappable by a user to control emitted light). In some such embodiments, flat portions 1566 associated with those interactive elongate members may be visually or tactilely distinguished from flat portions 1566 of non-interactive elongate members 1560. For instance, a flat end portion 1566 of an interactive elongate member 1560 may be colored or sized distinctly, or may be ribbed or have another distinguishable texture.

In various embodiments, such as one or more of those depicted in FIGS. 10-15, the elongate members may be adjusted in various ways. For instance, an elongate member may be adjusted between a position in which it contacts a luminaire (e.g., as shown in FIGS. 11-15) and a position in which it does not, but is readily accessible (e.g., as shown in FIG. 10). In some embodiments, when brought into physical contact with a luminaire, an end of an elongate member may be secured or otherwise fastened to the luminaire using various mechanisms, including but not limited to clips, adhesive, pins, hook-and-loop fasteners, and so forth. Additionally or alternatively, if it is desired that a particular portion of a luminaire be more or less sensitive, an elongate member extending from a lighting unit to that portion of the luminaire may be adjusted (e.g., shortened, lengthened, made more or less rigid, or otherwise altered) accordingly. In some embodiments, elongate members may be removable.

The embodiments of FIGS. 10-15 include elongate members that extend from a housing of a lighting unit outward. However, this is not meant to be limiting. In some embodiments, elongate members may be part of an adaptor, separate from a lighting unit, that can be installed onto/into a luminaire (e.g., into its socket or elsewhere) in conjunction with the lighting unit configured to aspects of the present disclosure. In such cases, the lighting units may be configured to "learn" about one or more physical properties of the adaptor using techniques similar to those described above.

In some embodiments, the luminaire itself may be optimized to transfer applied mechanical force and/or movement from the luminaire to the accelerometer. This may facilitate detection of applied mechanical forces and/or movement of the luminaire should a lighting unit configured with selected aspects of the present disclosure be installed. For instance, the luminaire may be equipped with one or more of its own elongate members that extend towards a point of the luminaire that is near where an accelerometer of an installed lighting unit would be. In some embodiments, the elongate members may extend from near an exterior of the luminaire inward towards the center.

Additionally or alternatively, in some embodiments, a luminaire may be equipped with one or more of its own accelerometers. These accelerometers may be configured to provide signals to a lighting unit that is installed into the luminaire, or to a remote computing device. In the latter case, the remote computing device may analyze the signals and transmit instructions to an installed lighting unit (which may or may not be configured with selected aspects of the present disclosure but may have communication capabilities), which may adjust the light it emits accordingly.

In various embodiments, applied forces and/or movements in various directions may be interpreted by a controller of a lighting unit in various ways. For instance, vertical taps may be interpreted as increasing or decreasing a value of a current lighting property (e.g., brightness), wherein a horizontal tap may be interpreted as an instruction to change a property (e.g., color), or even a direction in which light is emitted by the lighting unit. Additionally or alternatively, tapping on particular portions or regions of a luminaire may cause a lighting unit to emit a predefined lighting scene.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An LED-based lighting unit for installation into a luminaire, the LED-based lighting unit comprising:
   one or more LEDs;
   an accelerometer;
   a standard luminaire installation interface configured to attach and electrically couple the lighting unit to the luminaire and to retrofit the lighting unit to the luminaire; and
   a controller coupled with the one or more LEDs and the accelerometer, the controller configured to:
   receive, from the accelerometer, a signal representative of a measured mechanical force applied to or movement of the luminaire in which the LED-based lighting unit is installed;
   determine, based on the signal from the accelerometer, that the measured mechanical force or movement corresponds to one or more predetermined forces or movements; and
   energize the one or more LEDs to emit light having one or more properties selected based on the determination.

2. The LED-based lighting unit of claim 1, wherein at least one of the one or more predetermined forces or movements is associated with a particular physical region of the luminaire.

3. The LED-based lighting unit of claim 1, wherein the controller is further configured to transition to a learning state in which the controller monitors one or more characteristics of the signal from the accelerometer over a learning time interval and generates the predetermined forces or movements based on the monitored one or more characteristics.

4. The LED-based lighting unit of claim 3, wherein the controller is further configured to selectively energize the one or more LEDs to prompt a user to apply mechanical force to or to move the luminaire during the learning time interval.

5. The LED-based lighting unit of claim 3, wherein the controller is further configured to select, based on the signal from the accelerometer during the learning time interval, a property of light to which a predetermined force or movement is assigned.

6. The LED-based lighting unit of claim 3, further comprising a wireless communication interface, wherein the controller is configured to select, based on one or more instructions received at the wireless communication interface from a remote computing device, a property of light to which a predetermined force or movement is assigned.

7. The LED-based lighting unit of claim 1, wherein the controller is configured to determine that the measured force or movement corresponds to the one or more predetermined forces or movements based at least in part on one or more physical properties of the luminaire.

8. The LED-based lighting unit of claim 7, further comprising a user interface that is operable to provide, for use by the controller, an indication of the one or more physical properties of the luminaire.

9. The LED-based lighting unit of claim 7, further comprising a wireless communication interface operably coupled with the controller, wherein the controller is configured to receive, via the communication interface, an indication of the one or more physical properties of the luminaire.

10. The LED-based lighting unit of claim 7, wherein the controller is further configured to determine the one or more physical properties of the luminaire based on the signal from the accelerometer.

11. The LED-based lighting unit of claim 1, wherein the controller is further configured to:
energize the one or more LEDs over a sequence of time intervals so that during each time interval, the plurality of LEDs emit light having one or more different properties; and
freeze the sequential energizing during a time interval in which the controller determines, based on the signal from the accelerometer, that the measured force or movement of the luminaire corresponds to the one or more predetermined forces or movements.

12. The LED-based lighting unit of claim 1, wherein the controller is further configured to:
identify, based on the measured force, a physical region of the luminaire to which mechanical force was applied; and
select, based on the identified physical region, a property of light emitted by the one or more LEDs to alter in response to a determination that the measured force corresponds to one or more predetermined forces.

13. The LED-based lighting unit of claim 1, further comprising a microphone coupled with the controller, wherein the controller is configured to determine that the measured mechanical force or movement of the luminaire corresponds to the one or more predetermined forces or movements based further on a signal from the microphone.

14. The LED-based lighting unit of claim 1, wherein the controller is further configured to determine, based on the signal from the accelerometer, a vector representative of the measured mechanical force or movement.

15. The LED-based lighting unit of claim 14, wherein the controller is further configured to select one or more properties of light emitted by the one or more LEDs based on the vector representative of the mechanical force applied to or the movement of the luminaire.

16. The LED-based lighting unit of claim 14, wherein the measured mechanical force or movement of the luminaire is a first measured mechanical force or movement of the luminaire, the vector is a first vector, and the controller is further configured to:
determine, based on the signal, a second vector representative of a second measured force or movement of the luminaire; and
select the one or more properties of light emitted by the one or more LEDs based on a spatial relationship between the first and second vectors.

17. The LED-based lighting unit of claim 1, further comprising a gyroscope, wherein the controller is configured to determine that the measured force or movement of the luminaire corresponds to the one or more predetermined forces or movements based further on a signal from the gyroscope.

18. The LED-based lighting unit of claim 1, further comprising at least one elongate member extending outwardly from a housing of the lighting unit.

19. The LED-based lighting unit of claim 18, wherein the at least one elongate member extends from the lighting unit to physically contact a portion of the luminaire.

20. The LED-based lighting unit of claim 1, wherein the controller is further configured to:
determine, based on the signal from the accelerometer, a magnitude of the measured force or movement; and
select, based on the determination, the one or more properties of the emitted light.

* * * * *